US006624385B2

(12) United States Patent
Patton et al.

(10) Patent No.: US 6,624,385 B2
(45) Date of Patent: Sep. 23, 2003

(54) METHOD FOR MARKING GEMSTONES WITH A UNIQUE MICRO DISCRETE INDICIA

(75) Inventors: David L. Patton, Webster, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/027,016

(22) Filed: Dec. 21, 2001

(65) Prior Publication Data

US 2003/0121897 A1 Jul. 3, 2003

(51) Int. Cl.[7] ........................................ B23K 26/36

(52) U.S. Cl. ........................................ 219/121.69

(58) Field of Search ........................ 219/121.6, 121.67, 219/121.68, 121.69, 121.72, 121.83, 121.85

(56) References Cited

U.S. PATENT DOCUMENTS

| | | | | |
|---|---|---|---|---|
| 4,392,476 | A | * | 7/1983 | Gresser et al. |
| 4,467,172 | A | * | 8/1984 | Ehrenwald et al. |
| 4,847,183 | A | * | 7/1989 | Kruger |
| 5,121,256 | A | | 6/1992 | Corle et al. |
| 5,149,938 | A | | 9/1992 | Winston et al. |
| 5,272,330 | A | | 12/1993 | Betzig et al. |
| 5,410,125 | A | | 4/1995 | Winston et al. |
| 5,573,684 | A | | 11/1996 | Winston et al. |
| 5,753,887 | A | | 5/1998 | Rosenwasser et al. |
| 6,187,213 | B1 | | 2/2001 | Smith et al. |
| 6,211,484 | B1 | | 4/2001 | Kaplan et al. |

OTHER PUBLICATIONS

Imaging with Solid Immersion Lenses, Spatial Resolution, and Applications; Quang Wu, vol. 88, No. 9, Sep. 2000.

* cited by examiner

*Primary Examiner*—Samuel M. Heinrich
(74) *Attorney, Agent, or Firm*—Frank Pincelli

(57) ABSTRACT

A method for providing and reading micro-discrete indicia on a gemstone using near-field optics.

18 Claims, 7 Drawing Sheets

METHOD FOR MARKING GEMSTONES WITH A UNIQUE MICRO DISCRETE INDICIA

FIELD OF THE INVENTION

This invention relates a method and system for forming unique micro discrete indicia on a gemstone such as a diamond using near-field optical imaging.

BACKGROUND OF THE INVENTION

Recent advances in optics provide for a method of exposure of materials on a length scale much smaller than previously realized. Such near-field optical methods are realized by placing an aperture or a lens in close proximity to the surface of the sample or material to be exposed. Special methods for positioning control of the aperture or lens are required, as the distance between the optical elements (aperture or lens) is extremely small. Betzig and Trautman in U.S. Pat. No. 5,272,330 reported on the use of tapered optical fibers as a means of providing exposures in extremely small areas; exposures of the size of 10 nm in area are now relatively commonplace. In this case, the fiber tip position is maintained to be within some nanometers (typically 10–50) of the target surface. Others (see, for example, the review by Q. Wu, L. Ghislain, and V. B. Elings, Proc. IEEE (2000), 88(9), pg. 1491–1498) have developed means of exposure by the use of the solid immersion lens (SIL). Exposures produced by means of the SIL or other near-field optical methods can be much smaller in spatial extent than those produced by conventional optical systems and still be readable.

Optical means to mark diamonds and other gemstones have been previously described. Kaplan et al. in U.S. Pat. No. 6,211,484 B1 describe the use of a pulsed laser system and precision mechanical positioning controls to mark gemstones and a process to produce a secure certificate of authenticity. The laser in this instance operates with an approximate wavelength of 530 nanometers. This system achieves a positioning accuracy of about plus or minus a micron. The laser exposure produces a series of ablated or graphitic spots on the gemstone surface.

Smith et al. in U.S. Pat. No. 6,187,213 B1 describe the use of an ultraviolet (UV) laser system for marking diamond. The use of the 193 nanometers exposure with conventional optical elements produces a mark that is invisible because of its small size when viewed using an ×10 loupe.

In U.S. Pat. No. 5,753,887, Rosenwasser et al. describe the use of a laser system for engraving indicia on gemstones. Their invention entails the use of a gemstone holding system that minimizes internal exposure and thus damage to the internal structure of the gemstone. This minimization is accomplished by use of light transmissive elements to hold and position the gemstone. Such minimization is especially important in the application of novelty marking of larger gemstones where some considerable optical exposure is required in order to mark the gemstone.

The prior art does not teach marking a gemstone using near-field optics. Such near-field technology is used in the present invention to provide a means of marking a gemstone with micro discrete indicia and to use these micro discrete indicia for the purpose of authentication and personalization. The size of the micro discrete indicia produced using near-field technology is such that they do detract from the physical appearance of the gemstone.

The prior art does not teach the forming of the micro discrete indicia on a gemstone using near-field optics to alter the color of gemstone materials.

The prior art also does not teach linking the micro discrete indicia produced using near-field optics to an owner, retailer, or producer via a database for the purpose of authentication.

SUMMARY OF THE INVENTION

In accordance with one aspect of the present invention there is provided a method for providing micro-discrete indicia on a gemstone, comprising the steps of:

providing a gemstone;

selecting an area on the gemstone for placement of a micro-discrete indicia; and forming the micro-discrete indicia on the gemstone using near-field optics.

In accordance with another aspect of the present invention there is provided a method for reading a micro-discrete indicia on a gemstone, comprising the steps of:

locating the micro-discrete indicia on the gemstone; and reading the micro-discrete indicia using near-field optics.

In accordance with yet another aspect of the present invention there is provided a gemstone having a micro-discrete indicia formed thereon wherein the micro-discrete indicia image was formed using near-field optics.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 9 is an enlarged partial view of the image of the micro discrete indicia located on the gemstone displayed by the apparatus described in FIG. 8.

DETAILED DESCRIPTION OF THE INVENTION

The invention has been described in detail with particular reference to certain preferred embodiments thereof, but it will be understood that variations and modifications can be effected within the spirit and scope of the invention.

Because of their high value, diamonds and other gemstones are frequently marked for purposes of authentication. Additionally, diamonds and other gemstones are marked for personalization, decorative, or novelty reasons. It is important that such markings do not detract from the appearance of the finished diamond or gemstone. In the authentication of such gemstones, indicia or other markings should not be visible to the purchaser under ordinary use conditions so as to preclude detracting from the finished appearance. For purposes of personalization, novelty, or decoration, such markings should be made with extreme precision, while the desirability for making such markings visible under ordinary use conditions may or may not be a requirement. In either of these situations, the use of near-field optical methods for marking is advantageous since the resolution is higher than conventional means of optical exposure. This enables either a more precise exposure or the production of indicia that are smaller than that produced by conventional means of optical exposure. The invention provides a method and system for marking each gemstone with a unique identification number that is recorded in a data record so it can be used to track the heritage and ownership of the gemstone. The unique identification number can be assigned or registered to an owner, retailer, producer, country of origin, mine, etc.

The method comprises a system for the creation of unique micro discrete indicia on a gemstone using near-field optics, the gemstone may be a diamond, ruby, sapphire, emerald, opal etc. The micro discrete indicia can be an alphanumeric, a logo, a symbol, a design, etc. The size of each micro discrete indicium is in the range of 2 to 20 microns. The method of identifying the gemstone using the unique micro discrete indicia includes locating and scanning or optically viewing the gemstone and viewing the micro discrete indicia. The obtained micro discrete indicia may be used for a variety of purposes. For example, the identification indicia can be used to identify a particular gemstone on which it is formed. Alternatively, the micro discrete indicia is well suited for authentication of the gemstone. For example, the gemstone is genuine and/or comes from a particular source. Finally, the method may be used for purposes of personalization, ornamentation, decorative, or novelty reasons.

Figure 1:
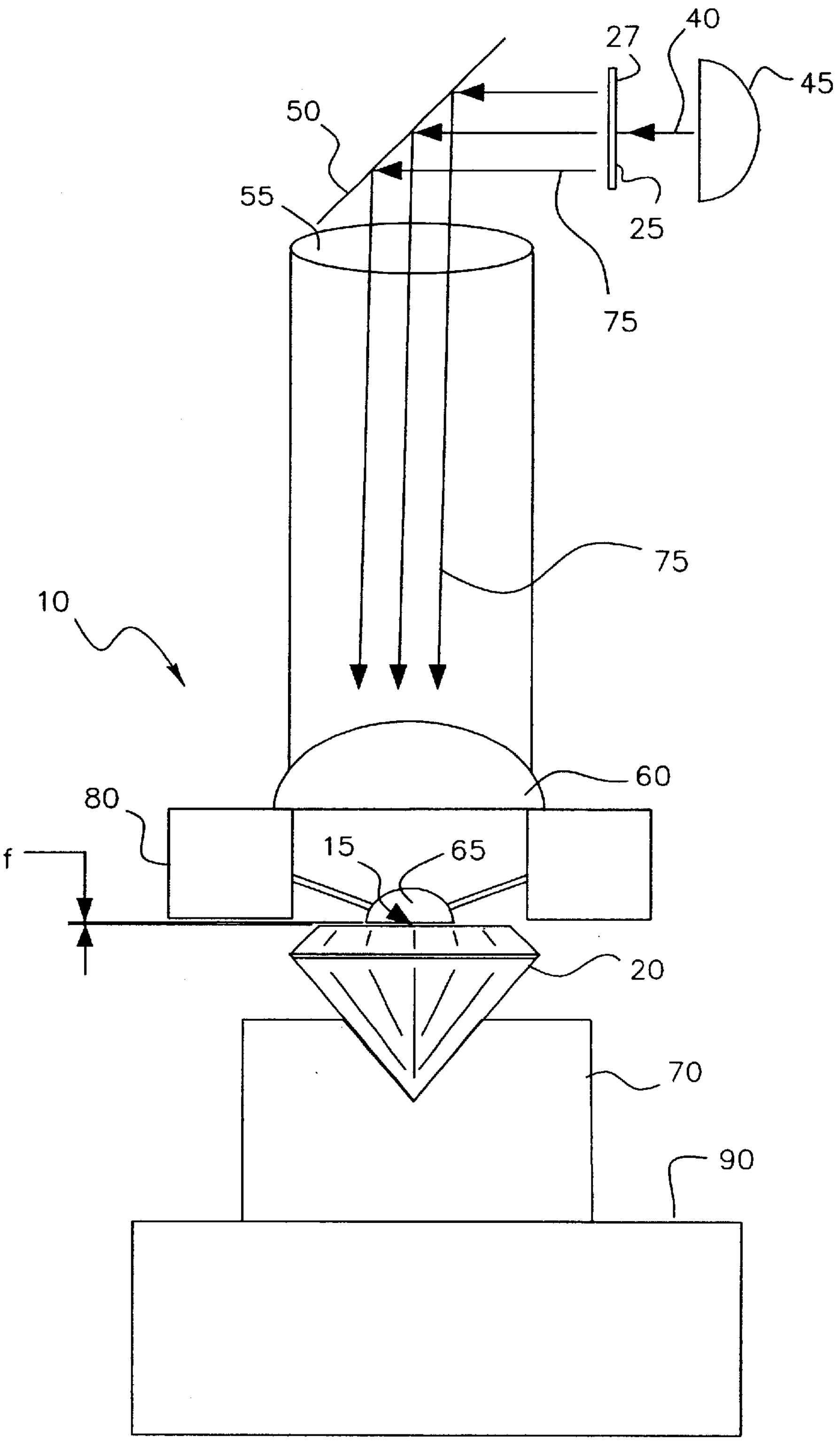
FIG. 1 is a schematic view of an apparatus for forming the various indicia on a gemstone using near-field optics.

Referring now to FIG. 1, there is illustrated an apparatus 10 for forming unique micro discrete indicia 15 on a gemstone 20 such as a diamond. Indicia 15 are created on the gemstone 20 by transmitting light from a light source 45 through a mask 25 containing an image 27. The light beam 40 from a variety of laser light sources 45 such as an Excimer, or a frequency doubled Nd:YAG laser passes through the mask 27 and is reflected by a mirror 50, through a lens system 55 and passes through an objective lens 66 of conventional design and impinges onto a solid immersion lens (SIL) 65. The gemstone 20 resting on a stage 70 is placed within a critical distance f. Images formed from such a system will have a lateral spatial resolution that exceeds the classical diffraction limit as is well known to those skilled in the art. The light beam 75 passes through an objective lens 60 of conventional design and impinges onto a solid immersion lens (SIL) 65. The SIL 65 is positioned within the near-field coupling limit appropriate for the particular lens in use by the use of a positioning device 80. U.S. Pat. No. 5,121,256, Corle et al. discloses a method for positioning an SIL using an interferometer constructed between the SIL and the sample. A laser can be used to set up standing waves between the bottom surface of the SIL and the top surface of the sample. In one configuration the laser can be brought into the system through a beam splitter in such a way as to produce plane waves in the region between the bottom of the SIL and the top of the sample. There will be interference between the laser light reflected from the bottom of the SIL and the top of the sample. A path difference of a quarter of a wavelength ($\lambda/4$) will cause the interference pattern to change from bright to dark so that controlling the distance between the SIL and the sample to a few nanometers is achieved by sensing the reflected light with a photodiode or the like and using the output as the input to a control system. A number of physical mechanisms play a role in the marking of a diamond or gemstone. Included among these is light-induced ablation of the gemstone material as a result of the rapid deposition of energy from the laser light beam. In some instances a light absorbing material is coated on the diamond or gemstone surface to facilitate direct absorption of the light beam energy. Subsequent conversion of the absorbed energy to heat causes material to be ablated from the near-surface region. Colored gemstones in most instances do not require this surface coating to be applied. It is also possible to alter the color of gemstone materials as a result of the laser light beam affecting the defect concentration in the gemstone or diamond material. It is known to those skilled in the defect physics of such materials that either through direct light absorption into existing defect optical absorption bands or through multi-photon absorption processes, color center can be produced in these materials. The presence of these color centers as a result of the action of the laser light write beam can be determined by a variety of optical methods including absorption or luminescence measurement. The stage 70 is located on an x, y, z, and θ translation device 90. Alternatively there are many other known translation devices for positioning the stage 70 in the art such as nano or micro positioning techniques. The image 27 used to form the micro discrete indicia 15 can be an alphanumeric or a symbol such as a logo. If an alphanumeric is used as the micro image, this can also be used as a serial number and/or code for use in further authenticating the gemstone or providing additional information directly from the alphanumeric or be used to look up information from a database.

Figure 2A:
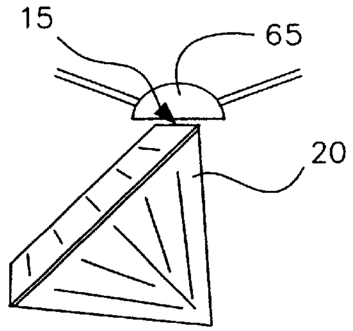
FIGS. 2*a, b,* and *c* are schematics illustrating different surfaces on a gemstone, onto which the indicia may be formed using near-field optics.
Figure 2B:
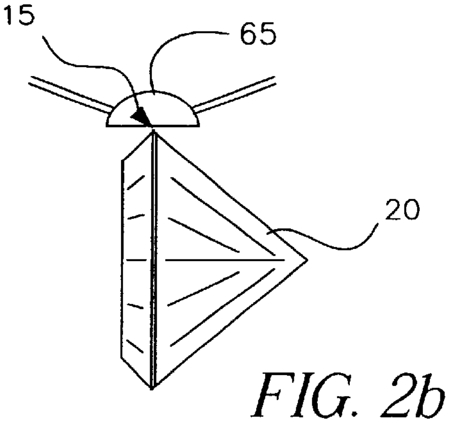
Figure 2C:
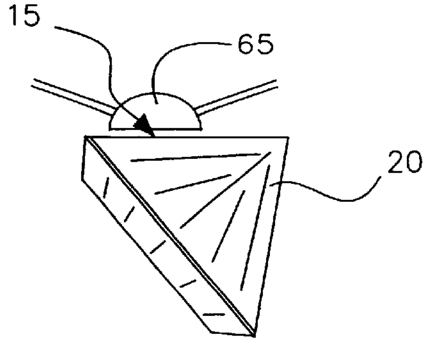

Referring to FIGS. 2*a, b*, and *c*, there are illustrated the different surfaces on which the indicia may be formed using near-field optics.

Figure 4:
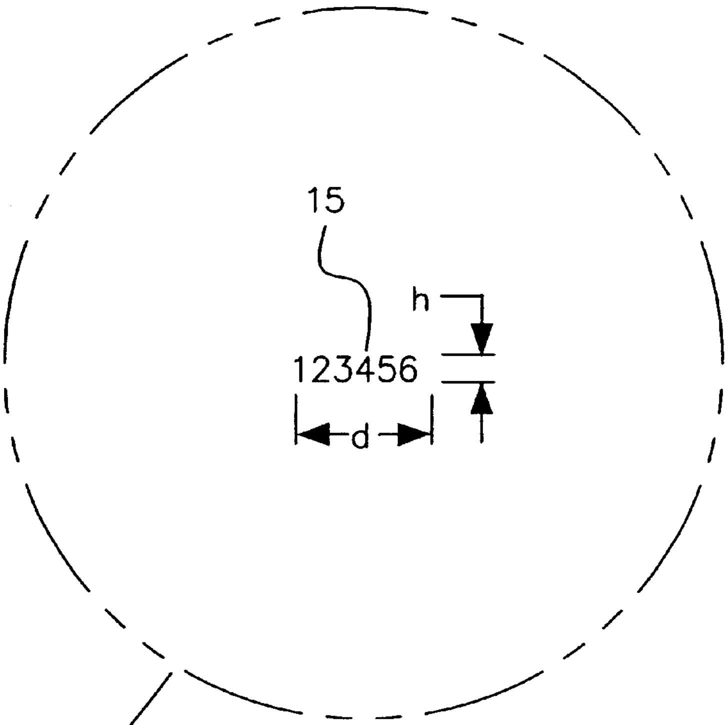
FIG. 4 is an enlarged partial view of a portion of the gemstone of FIG. 3 illustrating micro discrete indicia.
Figure 3:
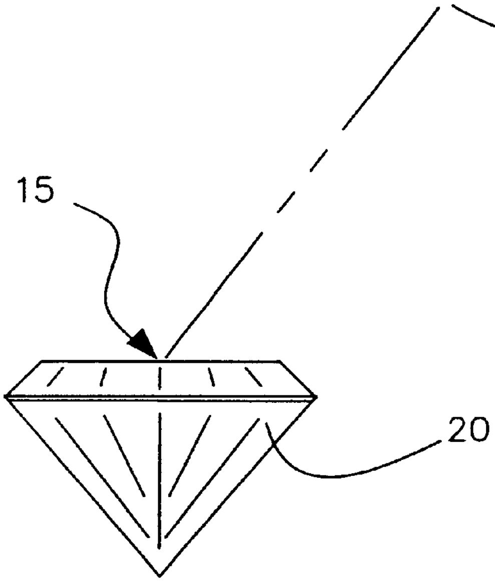
FIG. 3 is an enlarged plan view of a gemstone made in accordance with the present invention containing unique micro discrete indicia.

Referring to FIG. 3, there is illustrated a plan view of the gemstone 20 containing the micro discrete indicia 15 shown in an enlarged plan view in FIG. 4. Preferably the length "d" of the indicia 15 is no greater than approximately 10 microns and a height "h" is no greater than approximately 2 microns. The indicia 20 can be of such a size that can be read using near-field optical imaging when placed on the gemstone but not detract from the original appearance as viewed under normal viewing conditions.

Figure 5:
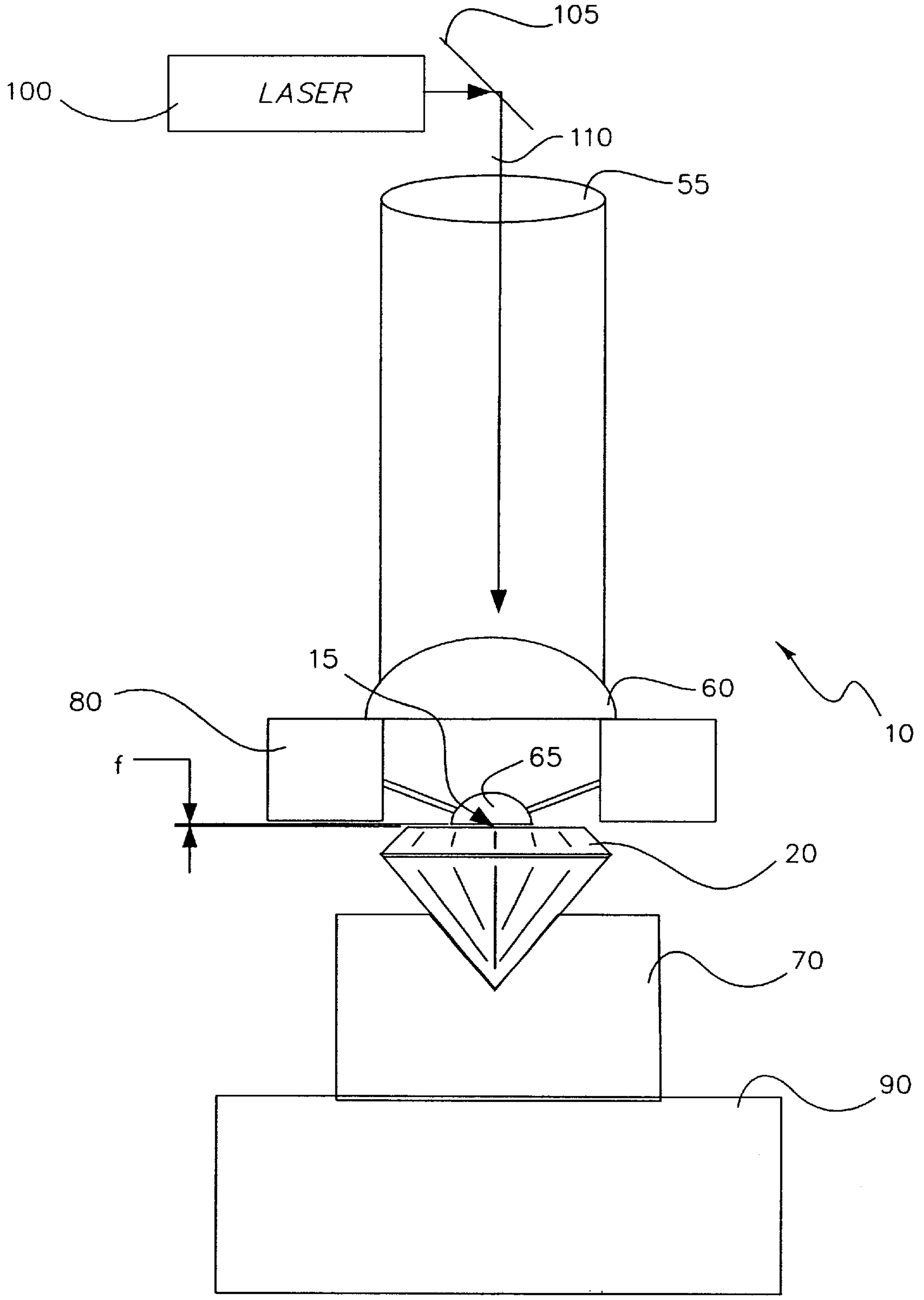
FIG. 5 is a schematic view of another embodiment the apparatus for forming the various indicia on a gemstone using near-field optics made in accordance with the present invention.

Referring now to FIG. 5, there is illustrated another embodiment of the apparatus for forming the various indicia on a gemstone using near-field optics made in accordance with the present invention. Indicia 15 are created on the gemstone 20 by transmitting light from a laser 100. The laser light beam 110 is reflected by a mirror 105, through a lens system 55 and passes through an objective lens 60 of conventional design and impinges onto a solid immersion lens (SIL) 65. The gemstone 20 resting on a stage 70 is placed within a critical distance f. The SIL 65 is positioned within the near-field coupling limit appropriate for the particular lens in use by the use of a positioning device 80. Such a positioning device could be a flying head as is used in hard disk storage devices. The stage 70 is located on an x, y, z, and θ translation device 90. Alternately there are many known in the art as nano or micro positioning technologies. The laser light beam 110 is used to form the image 27 of the micro discrete indicia 15 as shown in FIG. 7.

Figure 6:
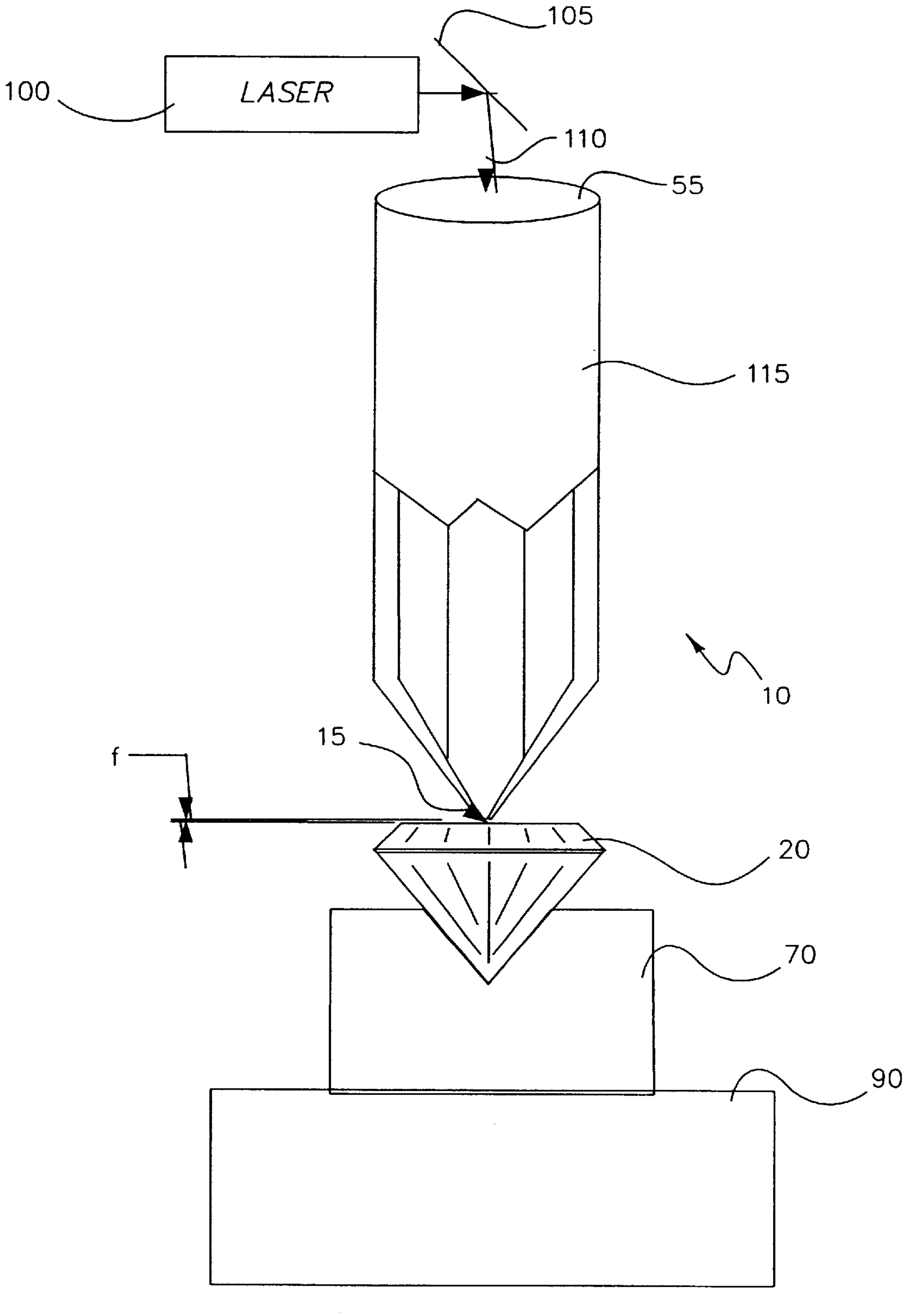
FIG. 6 is a schematic view of yet another embodiment the apparatus for forming the various indicia on a gemstone using near-field optics made in accordance with the present invention.

Referring now to FIG. 6, there is illustrated yet another embodiment of the apparatus for forming the various indicia on a gemstone using near-field optics made in accordance with the present invention. Indicia 15 are created on the gemstone 20 by transmitting light from a laser 100. The laser light beam 110 is reflected by a mirror 105, through a lens system 55 and passes through a tapered optical fiber 115. The gemstone 20 resting on a stage 70 is placed within a critical distance f. The tapered optical fiber 115 is positioned within a critical distance f; images formed from such a system will have a lateral spatial resolution that exceeds the classical diffraction limit as is well known to those skilled in the art. The tapered optical fiber 115 is positioned within the near-field coupling limit appropriate for the particular tapered optical fiber in use by the use of a positioning device 80. A method for the positioning of such tapered optical fibers includes the measurement of mechanical damping forces as a result of interaction of the fiber tip with the surface of the sample material. This interaction causes a shift of the mechanical resonance frequency for the tip if it is vibrated upon approach towards the surface. As was previously described in FIG. 1, but is done one point at a time. Such a positioning device could be a flying head as is used in hard disk storage devices. The stage 70 is located on an x, y, z, and θ translation device 90. The laser light beam 110 is used to form the image 27 of the micro discrete indicia 15 as shown in FIG. 4.

Figure 7A:
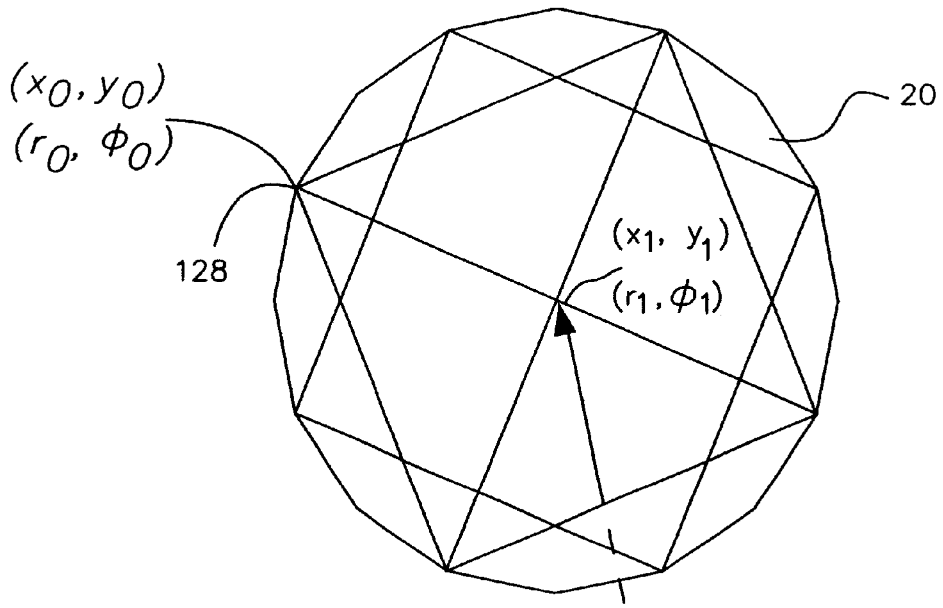
FIG. 7*a* is a schematic illustrating a method for locating the indicia on a gemstone described in FIG. 4 made in accordance with the present invention.
Figure 7B:
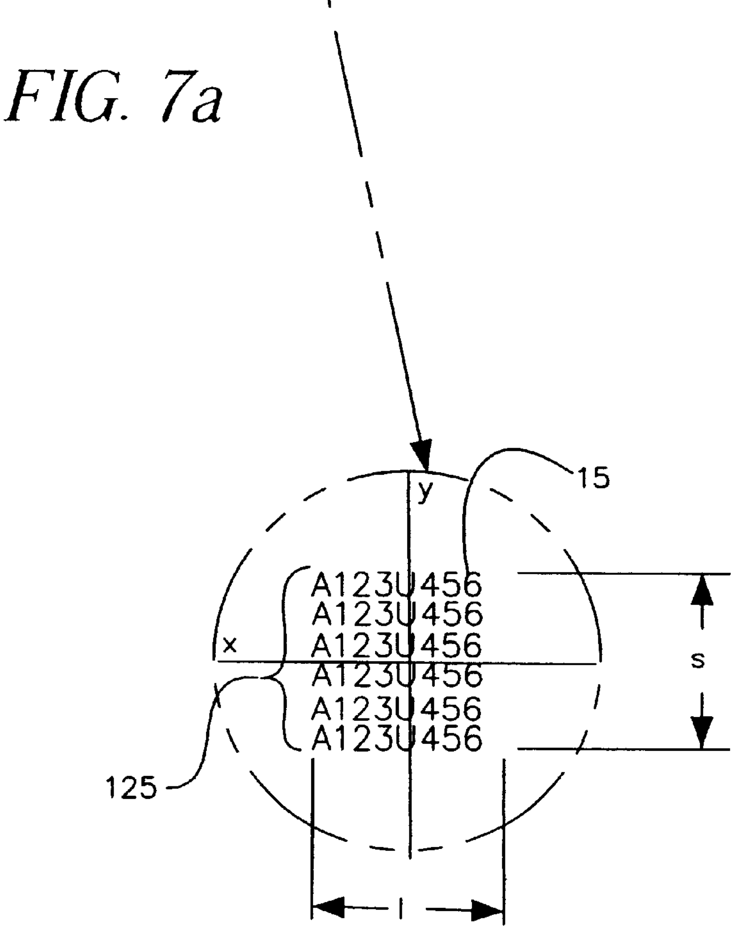
FIG. 7*b* is an enlarged partial view of a portion of the gemstone of FIG. 7*a* where the indicia are provided.

Referring now to FIGS. 7*a* and 7*b*, there is illustrated a method for locating the micro discrete indicia 15 on the surface of the gemstone 20. For each producer of gemstones a unique set of the coordinates $(x_1, y_1)$ for the location of the micro discrete indicia 15 can be specified. Using these coordinates the producer's unique micro discrete indicia 15 can be located from a designated feature 128 such as a facet whose location is $(x_0, y_0)$ or if polar coordinates are used is $(r_0, \theta_0)$. In another embodiment the coordinates $(x_1, y_1)$ or $(r_1, \theta_1)$ for the location of the micro discrete indicia 15 or can be specified on a document of authenticity (not shown), which can accompany each gemstone 20. The location $(x_1, y_1)$ or $(r_1, \theta_1)$ of the indicia 15 can be given from the designated feature 128 such as a facet whose location is $(x_0, y_0)$ or if polar coordinates are used is $(r_0, \theta_0)$. In yet another embodiment of the present invention, the indicia 15 can be located by repeatedly forming the indicia 15 using the near-field apparatus 10 creating a set of indicia 125. The set of indicia 125 forms a mark having a length "l" and height "s", which is visible through a normal optical microscope (not shown) and can be located using the normal optical microscope. The length "1" and height "s" can be of a range of between 0.02 millimeters to 0.1 millimeter depending on the magnification of the viewing microscope or viewing eye loop used. After the set of indicia 125 has been located, the near-field optical apparatus 200 (described in FIG. 8) is used to read the individual micro discrete indicia 15, which by itself is not readable unless view through the near-field apparatus 200.

Figure 8:
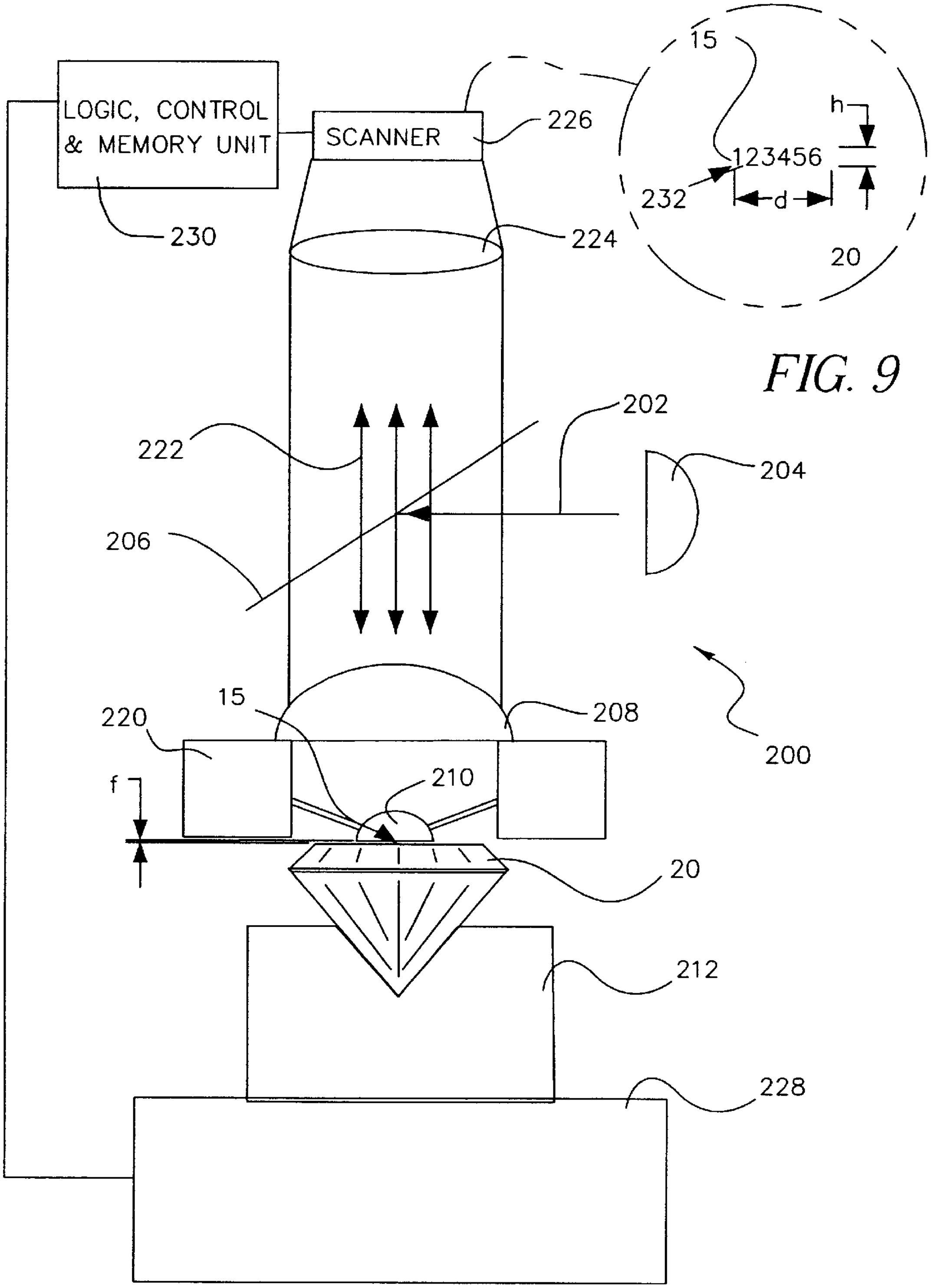
FIG. 8 is a schematic view of an apparatus used for viewing the micro discrete indicia located on the gemstone described in FIG. 4.

Once it has been determined that indicia 15 is present, referring now to FIG. 8, there is illustrated the apparatus 200 for locating and viewing the indicia 15 formed on the gemstone 20. The indicia 15 on the gemstone 20 can be viewed using magnifying imaging device 200 or used to capture an image of the indicia 15. A light beam 202 from a light source 204 reflects from a beam splitter 206 and passes through an objective lens 208 of conventional design and impinges onto a solid immersion lens (SIL) 210. The gemstone 20 resting on a stage 212 is placed within a critical distance f. The SIL 210 is positioned within the near-field coupling limit appropriate for the particular lens in use by the use of a positioning device 220. Such a positioning device could be a flying head as is used in hard disk storage devices. The light beam 202 is reflected from the gemstone 20, passes through the SIL 210, the objective lens 208, and the beam splitter 206, imaging the indicia 15 onto a sensor 226 by a lens system 224. The stage 212 is located on an x, y, z, and θ translation device 228. The x, y, z, and θ translation device 228 is and connected to the scanner 224 by a logic, control and memory unit 230. Referring now to FIG. 9, an enlarged partial view of the image 232 of the indicia 15 captured by the device 200 is shown. Using the imaging device 200, the image of the indicia 15 on the gemstone 20 is displayed for viewing for authentication and identification purposes. The size of the indicia 15 is such that the indicia 15 can appear on one or more surfaces of the gemstone 20 as shown in FIGS. 2*a, b,* and *c*. The indicia 15 formed on the gemstone 20 are of a size such that they are not visually discernable on the gemstone 20 with the unaided eye under normal viewing conditions or detract from the overall original appearance of the gemstone 20. As previously discussed, the size is preferably no greater than about 20 microns, and is generally in the range of about 2 to 20 microns. In situations where the micro discrete indicia is used for the purpose of personalization, ornamentation, decorative, or novelty the size of the micro discrete indicia may be made as large as deemed appropriate. The size of the micro discrete indicia for personalization or ornamentation may be but is not limited to a size range of 0.1 millimeters or larger. The size can be such that it can be viewed by the user with an unaided eye or with the use of a low power loop.

The method comprises creation of the unique micro discrete indicia 15 using the apparatus 10 as described in FIG. 1. The unique discrete indicia 15 represents a unique identification number assigned or registered to an individual or business which directly links the individual or business such as a retailer, producer, country of origin, or mine to the gemstone 20. The unique discrete indicia 15 are formed on the gemstone 20 using near-field optics. The unique identification number is then stored in a table as shown in Table 1 on a database and linked with information such as carat, clarity, cut, color etc describing the gemstone, the information describing the owner, retailer, producer, country of origin, and/or mine along with the exact location on the gemstone 20 of the micro discrete indicia 15. The location of the micro discrete indicia can be the given for a specific gemstone cut such as a marquis, baguette, solitaire, etc. The location of the micro discrete indicia can be also be designated by the owner, retailer, producer, country of origin, and/or mine as described in FIGS. 7*a* and 7*b*. To determine the authenticity of the gemstone 20 the unique-identification number is obtained by scanning the unique discrete indicia 15 on the gemstone 20 using the near-field optical imaging apparatus 200 as described in FIGS. 8 and 9. The unique identification number is looked up on the table located in the database and the associated information is retrieved. The owner, insurance company, retailer, law enforcement, producer, gem cutters and or mine can use the unique identification number and the database to identify a particular gemstone as to where the gemstone was mined, cut, who produced the gemstone, who sold the gemstone and who bought or owns the gemstone and to insure the gemstone is authentic. As can be seen from the foregoing the providing of micro discrete indicia on gemstones made in accordance with the present invention provides a method for allowing independent verification of the authenticity and/or the source of a gemstone directly from the gemstone, and also provides a mechanism for personalization, novelty, or decoration of such products. The invention has been described in detail with particular reference to certain preferred embodiments thereof, but it will be understood that variations and modifications can be effected within the spirit and scope of the invention.

TABLE 1

| ID Number | Type of Gemstone | Country of Origin | Producer | Cuter | Retailer | Owner | Description |
|---|---|---|---|---|---|---|---|
| | | Mine | | | | | |
| A12345678 | Diamond | Botswana | DeBeers | Diamond | Patton's Fine Jewelry | John Spoonhower | Carat = 2 |
| | | Debswana Mining | | Factory | 12 First Street | 34 Park Avenue | Cut = Baguette |
| | | Company | | Amsterdam | Webster, NY 14580 | Rochester, NY | Color = E |
| | | | | | | | Clarity = VVS |
| 8959R3652 | Emerald | Columbia | Gem Labs | Gem Labs | Patton's Fine Jewelry | Juliana McClain | Carat = 1.07 |
| | | Coscuez Mines | | | 12 First St. | 8 Central Park W | 7.0 × 50 mm Emerald Cut |
| | | | | | Webster, NY 14580 | New York, NY | Strong Strongly Bluish Green Slightly Included |

It is to be understood that various changes and modifications made be made without departing from the scope of the present invention, the present invention being defined by the claims that follow.

PARTS LIST

10 apparatus
15 unique micro discrete indicia
20 gemstone
25 mask
27 image
40 light beam
45 light source
50 mirror
55 lens system
65 solid immersion lens (SIL)
66 objective lens
70 stage
75 light beam
80 positioning device
90 translation device
100 laser
105 mirror
110 laser light beam
115 tapered optical fiber
125 set of indicia
128 facet
200 apparatus
202 light beam
204 light source
206 beam splitter
208 objective lens
210 solid immersion lens (SIL)
212 stage
224 lens system
226 sensor
228 translation device
230 logic and memory
232 image

What is claimed is:

1. A method for providing micro-discrete indicia on a gemstone, comprising the steps of:

providing a gemstone;

selecting an area on said gemstone for placement of a micro-discrete indicia; and forming said micro-discrete indicia on said gemstone using near-field optics.

2. A method according to claim 1 wherein said micro-discrete indicia has a size no greater than about 20 microns.

3. A method according to claim 2 wherein said micro-discrete indicia has a size no greater than about 10 microns.

4. A method according to claim 1 wherein said near-field optics produces said micro-discrete indicia by ablation of an image on said gemstone.

5. A method according to claim 1 wherein said near-field optics produces an image by color center production on said gemstone.

6. A method according to claim 1 wherein said micro-discrete indicia is an authentication indicia.

7. A method according to claim 6 wherein said micro-discrete indicia is used for identification of said gemstone.

8. A method according to claim 1 wherein said micro-discrete indicia comprises a personalized indicia.

9. A method according to claim 8 wherein said micro-discrete indicia has a size no less than 0.1 millimeters.

10. A method according to claim 8 wherein said personalized indicia comprises a decorative design.

11. A method according to claim 1 wherein said gemstone comprises one of the following:

diamond, ruby, sapphire, emerald or opal.

12. A method according to claim 1 wherein said near-field optics comprises a solid immersion lens.

13. A method according to claim 1 wherein said micro-discrete indicia is formed using a taper optical fiber.

14. A method according to claim 1 wherein said micro-discrete indicia comprises an alpha-numeric indicia.

15. A method according to claim 1 wherein said micro-discrete indicia comprises a logo.

16. A method according to claim 15 wherein said logo is associated with a business establishment.

17. A method according to claim 1 wherein in micro-discrete indicia is associated with a particular retail establishment that sold said gemstone.

18. A method according to claim 1 wherein in micro-discrete indicia is associated with a particular producer, country of origin, mine of said gemstone.

* * * * *